United States Patent [19]

Izumitani et al.

[11] 3,714,073

[45] Jan. 30, 1973

[54] SEMICONDUCTIVE GLASS HAVING LOW RESISTANCE

[75] Inventors: Tetsuro Izumitani, Tokyo; Yoshiyuki Asahara, Kanagawa; Makoto Tsuchiya, Tokyo; Asamu Nagarekawa, Saitama, all of Japan

[73] Assignee: Hoya Glass Works, Tokyo, Japan

[22] Filed: Aug. 27, 1971

[21] Appl. No.: 175,603

[30] Foreign Application Priority Data

Aug. 28, 1970 Japan .................................45/75419

[52] U.S. Cl. ...............................252/512, 106/47 R
[51] Int. Cl. ...........................H01b 1/06, C03c 3/30
[58] Field of Search.............252/500, 512; 106/47 R; 338/20; 317/234

[56] References Cited

UNITED STATES PATENTS

| | | | |
|---|---|---|---|
| 3,117,013 | 1/1964 | Northover et al. | 106/47 R |
| 3,241,009 | 3/1966 | Dewald et al. | 106/47 R |
| 3,312,924 | 4/1967 | Eubank et al. | 338/20 |
| 3,343,972 | 9/1967 | Hilton, Jr. et al. | 106/47 R |
| 3,448,425 | 6/1969 | Shanefield et al. | 252/512 X |
| 3,453,583 | 7/1969 | Shanefield et al. | 252/512 X |
| 3,498,930 | 3/1970 | Shanefield et al. | 252/512 |

OTHER PUBLICATIONS

A. R. Hilton et al., "Non-oxide IV A–V A–VI A chalcogenide Glasses," Physics and Chemistry of Glasses, Vol. 7, NO. 4, August 1966, pp. 105–126.

H. Rawson, "Ternary Chalcogenide Glasses," Inorganic Glass–Forming Systems, Academic Press, 1967, pp. 267–273.

*Primary Examiner*—Charles E. Van Horn
*Attorney*—Richard C. Sughrue et al.

[57] ABSTRACT

A semiconductive glass consisting of three components of As, Te, and Tl, the glass which has a very low specific resistance and is stably vitrified.

5 Claims, 1 Drawing Figure

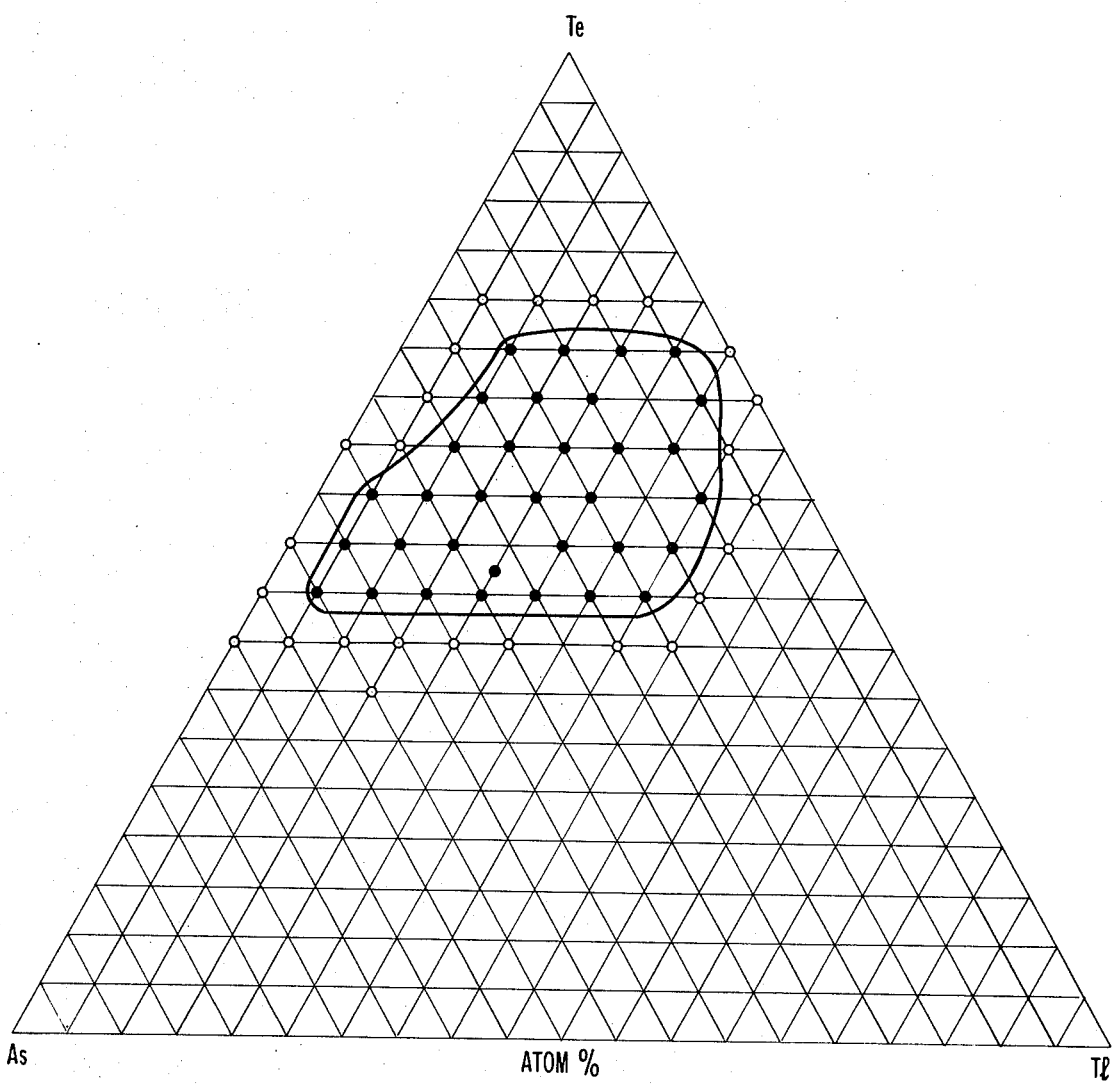

SEMICONDUCTIVE GLASS HAVING LOW RESISTANCE

BACKGROUND OF THE INVENTION

Heretofore, crystalline semiconductors of metal compounds and the like have been well known as semiconductors. A specific resistance of these crystalline semiconductors widely extends over a range of from about $10^{-3}$ to $10^8$ ohm-cm and there is one having a considerably low resistance. However, a highly skilled art is required for the preparation of these crystals and furthermore, since they are liable to be contaminated with impurities, raw materials having a very high purity are required for the crystals.

On the other hand, the characteristic features of a glass semiconductor reside in that there is required neither a highly skilled art nor raw materials having high purities for the production thereof. However, a specific resistance of a conventional oxide glass semiconductor is generally $10^7$ ohm-cm and even the lowest specific resistance thereof is about $10^5$ ohm-cm. Furthermore, a specific resistance of non-oxide glass semiconductors is limited to a value of $10^3$ ohm-cm.

It has been heretofore known that a glass having As-Te components has a comparatively low resistance, but a stable glass cannot be obtained from this As-Te two component system.

The present inventors have studied and developed a third component for stabilizing the As-Te two component system glass and further, for imparting a specific resistance being lower than that of a conventional semiconductive glass by from the second to fifth power of 10 to the aforesaid glass. As a result, it has been discovered that a favorable stability in vitrification and a low specific resistance can be imparted to the resulting glass by adding Tl as the third component to the As-Te system glass.

SUMMARY OF THE INVENTION

This invention relates to a semiconductive glass consisting of 5-50 atom percent of As, 45-70 atom percent of Te, and 5-35 atom percent of Tl and a specific resistance of which is such a low value as within a range of from about $6 \times 10^{-1}$ to $4.5 \times 10^3$ ohm-cm at room temperature.

In accordance with the foregoing, it is a primary object of this invention to obtain a semiconductive glass having a lower specific resistance than that of a conventional glass semiconductor by from the second to fifth power of ten.

Another object of this invention is to produce a semiconductive glass for which neither highly skilled art for the preparation thereof nor highly refined raw materials as in the preparation of crystalline semiconductors are required.

It is a further object of this invention to provide a semiconductive glass which can be very easily and stably produced.

The nature of the invention will be more clearly understood by reference to the following detailed description, the appended claims, and the diagram illustrated in the accompanying drawing.

BRIEF DESCRIPTION OF THE DRAWING

In the drawing, the single FIGURE is a diagram illustrating a vitreous range of a semiconductive glass having a low resistance and consisting of three components of As, Te, and Tl according to this invention.

DETAILED DESCRIPTION OF THE INVENTION

It is a reason for limiting the compounding ratio of Tl of the third component to a range of from 5 to 35 atom percent with respect to the total composition of the semiconductive glass of the present invention that when the ratio of Tl is less than 5 atom percent, it is insufficient for imparting a favorable stability in its vitrification to an As-Te system base glass and for lowering a value of the specific resistance thereof. Whereas when the compounding ratio of Tl is more than 35 atom percent, a mixture of As-Te-Ti is not vitrified.

Furthermore, a compounding ratio of the two base components of As-Te is determined with respect to a range in which the mixture can be stably vitrified in accordance with the addition of Tl, and a ratio of As is within a range of 5–50 atom percent and a ratio of Te is within a range of 45–70 atom percent with respect to the total composition of the semiconductive glass, respectively. That is, in the case when Tl is added to the As-Te base component of the compositions other than that defined as above, the mixture cannot be stably vitrified.

In the range of the compounding ratio defined above, from a mixture consisting of 5–30 atom percent of As, 45–70 atom percent of Te, and 10–35 atom percent of Tl, a semiconductive glass having a low specific resistance of less than $10^2$ ohm-cm is obtained. Furthermore, from a mixture consisting of 5–15 atom percent of As, 55–70 atom percent of Te, and 20–35 atom percent of Tl, a semiconductive glass having a very low specific resistance of less than $10^1$ ohm-cm can be produced.

In the following, the present invention will be described in connection with an example.

EXAMPLE

Each required amount of 99.9 percent arsenic, 99.99 percent tellurium, and 99.99 percent thallium was weighed and placed into an opaque quartz tube. The tube was maintained under a reduced pressure and sealed. Then, the contents of the thus sealed tube was melted in an electric oven at a temperature of 600°–700°C for about 1 hour while agitating intermittently. Thereafter, the thus molten material was taken out from the electric oven and was cooled by leaving the tube in the air as it was or dipping the tube into water at room temperature. After the cooling, the quartz tube was broken and the resulting sample glass was taken out. The sample glass was shaped by heating in a nitrogen stream into a suitable shape.

It was confirmed by powder X-ray diffractometry that the resulting sample was in the form of glass.

Each glass composition and each specific resistance of the resulting glass at room temperature will be shown in the following Table 1.

TABLE 1

| No. | Composition (atom %) | | | Specific resistance at Room Temperature (ohm-cm) |
|---|---|---|---|---|
| | As | Te | Tl | |

| | | | | |
|---|---|---|---|---|
| 1 | 50 | 45 | 5 | 4.53 × 10³ |
| 2 | 45 | 50 | 5 | 2.58 × 10³ |
| 3 | 38 | 57 | 5 | 1.26 × 10³ |
| 4 | 36 | 54 | 10 | 4.19 × 10² |
| 5 | 20 | 70 | 10 | 5.49 × 10¹ |
| 6 | 34 | 51 | 15 | 1.35 × 10² |
| 7 | 30 | 55 | 15 | 2.02 × 10¹ |
| 8 | 25 | 60 | 15 | 2.04 × 10¹ |
| 9 | 32 | 48 | 20 | 3.36 × 10¹ |
| 10 | 10 | 70 | 20 | 6.64 × 10⁰ |
| 11 | 25 | 50 | 25 | 1.93 × 10¹ |
| 12 | 15 | 60 | 25 | 2.15 × 10⁰ |
| 13 | 5 | 65 | 30 | 7.47 × 10⁻¹ |
| 14 | 20 | 45 | 35 | 4.20 × 10¹ |
| 15 | 10 | 55 | 35 | 6.01 × 10⁻¹ |

According to the example of this invention, the vitrifiable range of the semiconductive glass of this invention is as illustrated in the diagram of the accompanying drawing in which each shaded small circle or point indicates glass and each unshaded small circle or point indicates crystal, respectively.

In the above example, it was experimentally confirmed that the replacement of up to 5 atom percent of As component by Sb and the replacement of up to 15 atom percent of As component by P were possible, respectively. In this case, when As is replaced by Sb, the resistance of a glass decreases, but when As is replaced by P, the resistance of a semiconductive glass scarcely changes. In other words, in the case even where a base component consisting of Sb and P is employed, a semiconductive glass having a low specific resistance and being sufficiently stable in its vitrification can be produced by the addition of Tl.

The results of the example in the case when the As component is replaced by Sb or P will be shown in the following Table 2.

TABLE 2

| No. | Composition (atom %) | | | | Specific Resistance at Room Temperature (ohm-cm) |
|---|---|---|---|---|---|
| | As | Sb | P | TeTl | |
| 16 | 10 | 5 | 0 | 6025 | 1.45 ×10⁰ |
| 17 | 10 | 0 | 5 | 6025 | 3.32 × 10⁰ |
| 18 | 5 | 0 | 10 | 6025 | 1.60 × 10⁰ |
| 19 | 25 | 0 | 5 | 5515 | 1.94 ×10¹ |
| 20 | 20 | 0 | 10 | 5515 | 9.80 × 10⁰ |
| 21 | 15 | 0 | 15 | 5515 | 1.22 × 10¹ |

The As-Te-Ti system glasses according to this invention are low melting point glasses and they have very large hardness at room temperature. Accordingly, an effective practice of such a glass as mentioned above is considered.

What is claimed is:

1. A semiconductive glass having a low resistance consisting of from 5 to 50 atom percent of arsenic, from 45 to 70 atom percent of tellurium, and from 5 to 35 atom percent of thallium.

2. A semiconductive glass according to claim 1, in which up to 5 atom percent of arsenic is replaced by antimony.

3. A semiconductive glass according to claim 1, in which up to 15 atom percent of arsenic is replaced by phosphorous.

4. A semiconductive glass having a low resistance consisting of from 5 to 30 atom percent of arsenic, from 45 to 70 atom percent of tellurium, and from 10 to 35 atom percent of thallium.

5. A semiconductive glass having a low resistance consisting of from 5 to 15 atom percent of arsenic, from 55 to 70 atom percent of tellurium, and from 20 to 35 atom percent of thallium.

* * * * *